United States Patent [19]

Cottrell

[11] 4,130,936
[45] Dec. 26, 1978

[54] STICK HANDLING AND INSERTING METHOD AND APPARATUS

[75] Inventor: Edward D. Cottrell, Cattaraugus, N.Y.

[73] Assignee: Champion International Corporation, Stamford, Conn.

[21] Appl. No.: 823,621

[22] Filed: Aug. 11, 1977

[51] Int. Cl.² .............................................. B23Q 7/10
[52] U.S. Cl. ....................................... 29/809; 29/798; 425/126 S
[58] Field of Search ......................... 29/809, 798, 818; 227/112, 114, 117; 425/116, 126 R, 126 S

[56] References Cited

U.S. PATENT DOCUMENTS

| 2,733,439 | 2/1956 | Pikal | 227/116 X |
| 2,953,105 | 9/1960 | Rasmusson | 425/126 S |
| 3,632,245 | 1/1972 | Getman | 425/126 S X |

Primary Examiner—Victor A. DiPalma
Attorney, Agent, or Firm—Evelyn M. Sommer

[57] ABSTRACT

Handle sticks for frozen confections are removed from a hopper by a rotatable slotted wheel and driven by air under pressure through tubes, which can be curved, to an insertion station. Molds containing partially frozen material are conveyed to and aligned with the station. The sticks received at the station are aligned with the axes of the molds and driven into the molds by plungers.

22 Claims, 7 Drawing Figures

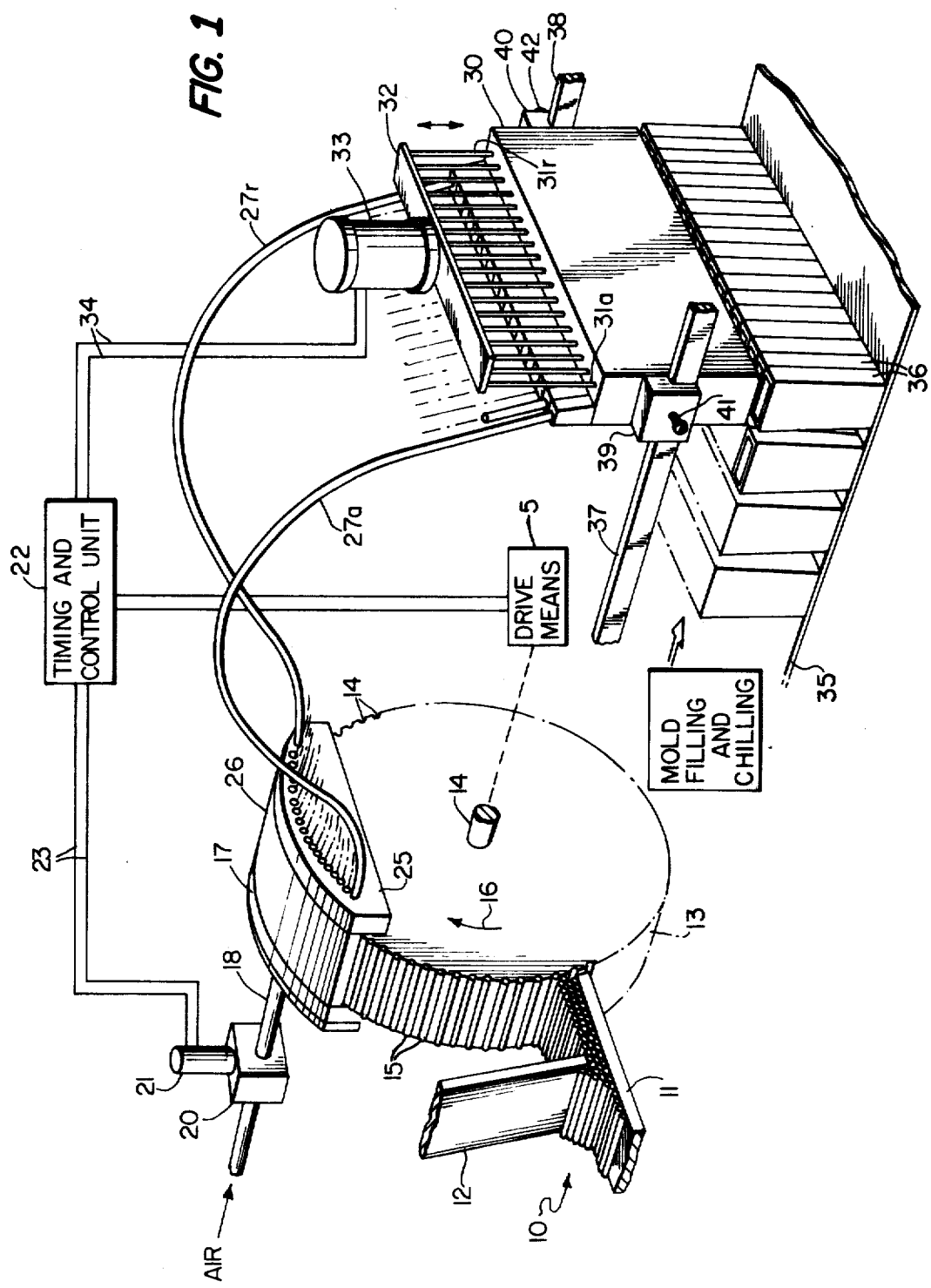

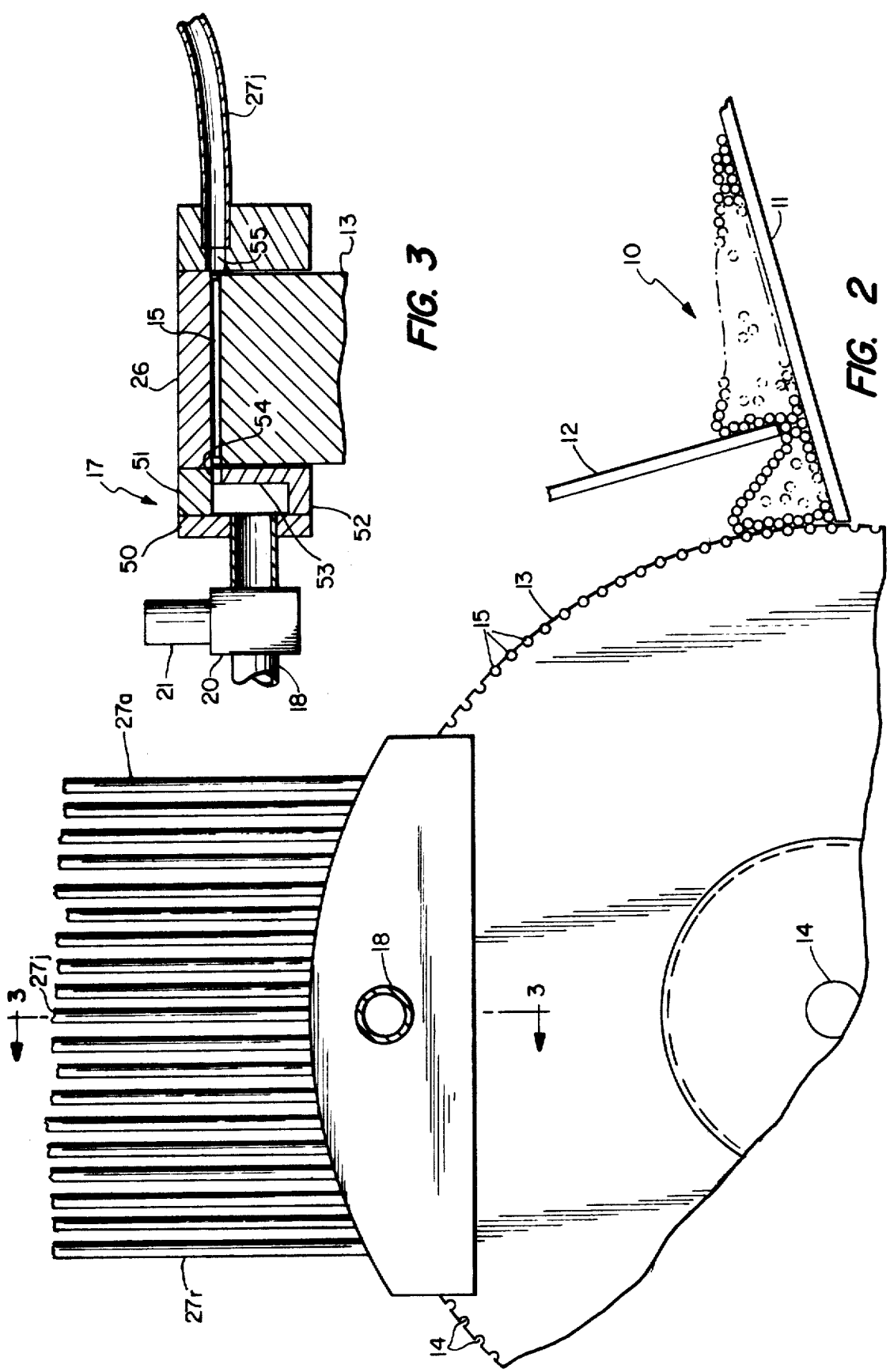

STICK HANDLING AND INSERTING METHOD AND APPARATUS

This invention relates to a stick feeding and inserting method and apparatus, particularly for use in making frozen confections in the nature of ice cream suckers.

BACKGROUND OF THE INVENTION

At the present time, frozen confections of the type with which the present invention can be used are produced by automatic or semi-automatic machinery in which groups of upwardly opening molds, typically 6 to 24 molds per group, are filled with the desired confection in liquid form. The molds are then passed through a brine bath at low temperature, conveyed by a chain drive mechanism which moves the molds in intermittent fashion. Thus, each group pauses for a portion of each cyle to permit the empty molds to be refilled, sticks to be inserted and the completely frozen confection to be removed at the end of the machine. The overall process as thus described forms no part of the present invention but rather supplies the environment in which the invention is used.

Of present interest in the process is the stick insertion. As will be recognized, there is a point in the brine bath chilling process at which the confection is sufficiently stiff to support an inserted stick but not so hard that insertion problems are created. The brine bath itself is maintained at a substantially constant temperature, so for any predetermined composition of the liquid confection, it is possible to exactly determine a distance from the filling station at which insertion of the sticks should be accomplished. This permits selection of the proper "pause" in the intermittent drive for the insertion step.

However, that distance varies significantly for different confection compositions. The desired insertion station location is therefore variable.

It will also be recognized that if flat sticks are to be used, it is necessary to orient the sticks and, with most mechanical inserters, a stick magazine must be refilled at frequent intervals by an attendant.

Various stick handling and insertion devices have been developed in the past, including those disclosed in the following U.S. Pat. Nos. which are listed in numerical order:

1,369,772 — Becker et al.
1,487,788 — Lombardo et al.
2,152,214 — Sattler
2,660,963 — Covert et al.
2,929,340 — Topfer
2,953,997 — Glass
2,998,784 — Glass
3,221,673 — Shelly
3,272,152 — Williams
3,285,199 — Waite et al.
3,395,652 — Conti
3,632,245 — Getman These patents show a wide variety of devices for making frozen and other confections and for supplying sticks thereto varying from the simple manually operated flat stick inserters such as Sattler and the "rotary" mold devices such as Becker et al. and Covert et al. to the somewhat more complex machines of Glass U.S. Pat. Nos. 2,953,997 and 2,998,784 and Conti. However, none of these are usable or adaptable to meet the needs of the system presently contemplated.

BRIEF DESCRIPTION OF THE INVENTION

The goals for a stick handling and insertion apparatus can be described as follows, and it will be seen from the subsequent detailed description that such goals are met by the apparatus of the present invention. First, it is desirable that round sticks be used and, although not essential to the invention, the most desirable form of stick is a convoluted paper stick which is about 4 inches (10.2 cm) long and about 11/64 inches (4.4 mm) in diameter. The machine should be capable of having a hopper which can hold a "one shift" supply of sticks, i.e., about 180,000 sticks to be used at a machine rate of 22,500 sticks per hour. The insertion mechanism should function at a rate of 18 to 20 cycles per minute, or about 360 stick insertions per minute with an 18 mold unit, with a low reject rate of 1% or less. It should be modular to permit quick and easy assembly of units having from 6 to 24 lines of sticks on minimum 1 inch centers, and should be easily changeable from one to another so that a variety of different products can be made without lengthy "down time" of the machine.

Additionally, the insertion mechanism should be mobile for adjustment of the inserter to accommodate the freeze conditions of the product, i.e., adjustment longitudinally toward and away from the mold filling station. The final position of the inserted stick should be 1 inch above the mold top, and the sticks should be placed within 1/16 inch (1.6 mm) of the product centerline and lean no more than 2° from vertical in any direction.

Finally, the machine components and construction should meet Dairy Code Standards, particularly as to materials, cleanliness and cleanability and should require a minimum of standard tools for disassembly and repair, and should be reliable and durable.

Briefly described, the invention includes an apparatus for delivering and inserting handle sticks into a plurality of molds containing partially solidified confection products, for use in combination with a machine having means for filling said molds and moving groups of the filled molds along a predetermined path, the apparatus comprising an insertion station located along and above said predetermined path, a stick feeding station at a location separated from said insertion station, means at said feeding station for aligning a predetermined number of sticks in substantially parallel spaced relationship, means for pneumatically conveying said predetermined number of sticks from said feeding station to said insertion station, and means at said insertion station for receiving said predetermined number of sticks, for aligning said sticks with the central axes of said molds, and for axially moving said sticks into said molds.

The invention also contemplates a method of forming frozen confection products including inserting handle sticks into the partially solidified products comprising the steps of aligning a predetermined number of round sticks in parallel spaced relationship with each other, propelling said number of sticks through tubular conduits to an insertion station with air under pressure, filling a plurality of molds, equal in number to the number of sticks, with a confection composition in flowable form, chilling the molds to partially solidify the composition, aligning the molds with said insertion station, mechanically driving said sticks, as a group, into said partially hardened composition, and further chilling the molds to complete the solidification of said products.

In order that the manner in which the various objects of the invention are obtained in accordance with the invention can be understood in detail, a particularly advantageous embodiment thereof will be described with reference to the accompanying drawings, which form a part of this specification, and wherein:

FIG. 1 is a perspective schematic view, in simplified form, of an apparatus in accordance with the invention;

FIG. 2 is a fragmentary view of a portion of the feeding station portion of the apparatus of FIG. 1;

FIG. 3 is a partial section along lines 3—3 of FIG. 2;

Figures 4, 5:
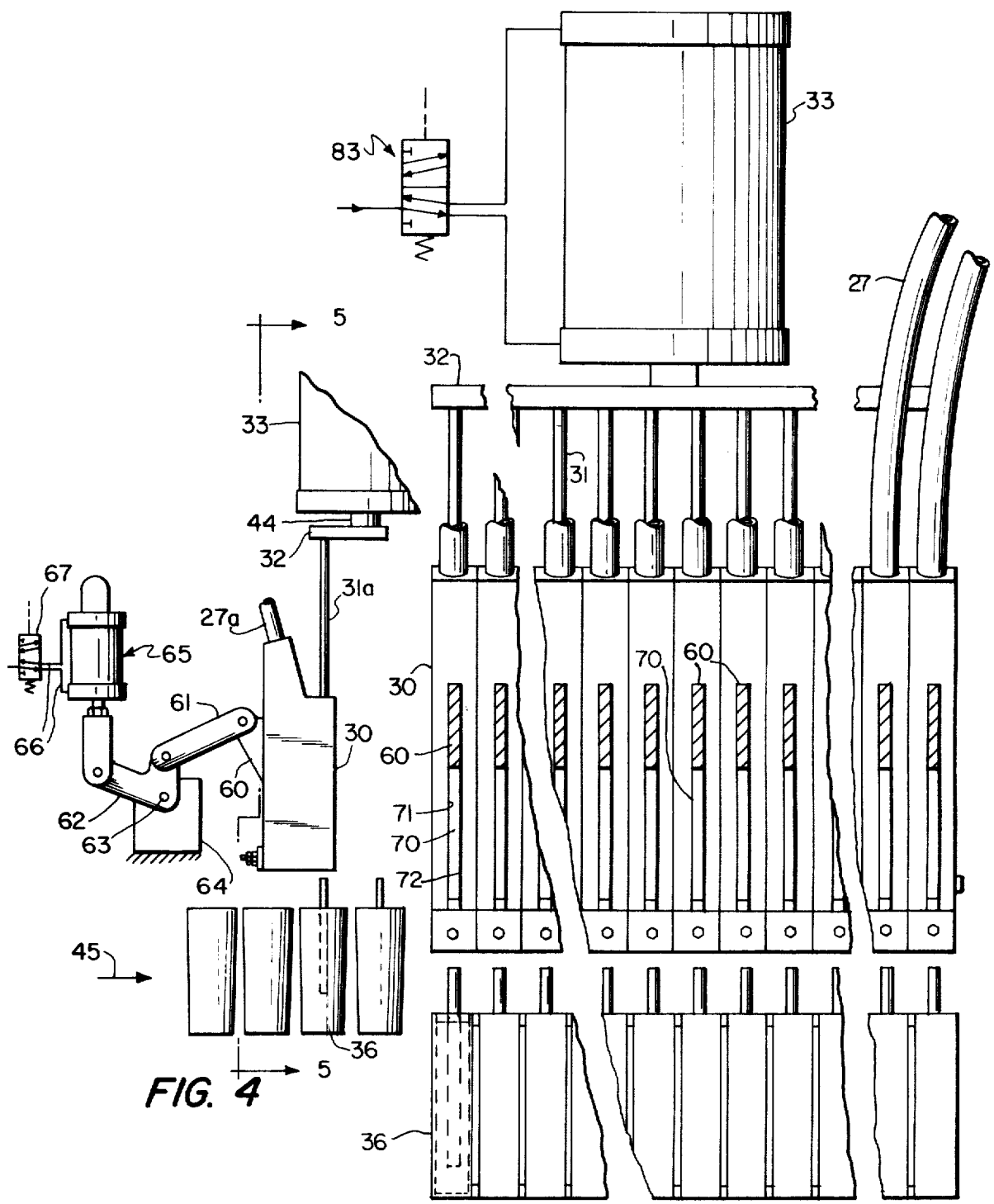
FIG. 4 is a simplified partial side elevation of the insertion station portion of the apparatus of FIG. 1.
FIG. 5 is an enlarged, foreshortened, partial front elevation of the apparatus, in partial section, along line 5—5 of FIG. 4.

Referring first to FIG. 1, it will be seen that the apparatus includes a hopper indicated generally at 10, for holding a large number of sticks, which are preferably convoluted paper sticks of substantially identical length and diameter. The hopper includes a sloping bottom support wall 11 and an upwardly extending barrier 12 having a lower end which terminates upwardly of the upper surface of wall 11 to permit a limited number of sticks to pass beyond barrier 12. A generally disc-shaped member 13 is mounted on a rotatable axle 14 which is intermittently driven by drive means 15 in a manner which will be described. The periphery of wheel 13 is provided with a plurality of radially inwardly extending recesses or slots 14 which are equally circularly spaced about the periphery of the wheel and which are concave. Thus, as the recesses are caused to pass wall 11 of the hopper assembly, sticks are permitted to enter the slots and are carried upwardly, wheel 13 being rotated in the direction of arrow 16. Thus, sticks 15 fill the recesses and are carried upwardly. It will be observed that the axial thickness of slotted wheel 13 is equal to or slightly greater than the length of the sticks so that the sticks do not protrude axially beyond the limits of the wheel.

At the upper portion of wheel 13 is a mechanism for removing the sticks and conveying them away from the slotted wheel. This apparatus includes a manifold block 17 which is connected to a conduit 18 which, in turn, is connected to a source of air under pressure through a conventional solenoid actuated valve assembly 20 having a solenoid portion 21 which is electrically connected to and energized by signals from a timing and control unit 22 through conductors 23. As will be recognized, solenoid 21 can be replaced by a pneumatically operated device.

Manifold block 17 includes a plate adjacent wheel 13 which has a plurality of holes extending axially relative to wheel 13, the holes being located along an arcuate path so that when wheel 13 is in the proper position, the holes are exactly aligned with sticks retained in slots 14. On the opposite side of that plate from wheel 13 is a manifold chamber connected to conduit 18 so that air passing through the conduit is delivered into the chamber and then into the holes aligned with the sticks, thereby tending to drive the sticks axially out of slots 14.

On the opposite side of wheel 13 from the manifold block is a feed block 25 which is a relatively simple plate having an arcuately arranged plurality of holes, equal in number to the holes through the plate portion of the manifold block, and aligned therewith. A cover member 26 extends between manifold block 17 and feed block 25 and closely covers the peripheral portion of wheel 13 which is between the blocks. Thus, a relatively airtight chamber is defined enclosing those slots 14 which lie in this region with the selected slots being aligned with the holes in the two blocks. Feed block 25 is also provided with conventional means, such as enlarged hole portions, for receiving the ends of a plurality of tubular conduits 27a-27r. These conduits extend, in a nonlinear or curvilinear fashion to inlet openings at an insertion station. The insertion station includes a housing 30 which has a plurality of chambers therein, each of the chambers being connected to the outlet ends of one of tubes 27a-27r. Thus, sticks propelled by the pressured air supplied through the manifold block are caused to pass through the feed block and through the tubes and into the chambers within housing 30. The sticks are then moved to an erect position in alignment with desired axes, and are driven downwardly by plunger members 31a-31r, the plunger members constituting rods extending downwardly through openings in the top of the housing and extending into the chambers within. The upper ends of the plunger rods are connected to a plunger bar 32 which is actuated by a pneumatically operated or electrically operated piston and cylinder or solenoid structure 33 which receives control signals on conduits or conductors 34 from timing and control unit 22. The details of this structure will further be described hereinafter.

As previously indicated, the apparatus with which the present invention is intended to be used includes a conveyor mechanism, schematically illustrated as being a belt 35, but which can be a chain mechanism such as, for example, that illustrated in the previously cited patent to Getman which conveys a plurality of upwardly opening molds 36 through a brine bath, not shown. The molds are arranged side-by-side in groups of predetermined numbers and are filled with a commestible composition in flowable form, the composition having whatever mix is desired to produce a final frozen confection product. The filled molds are then chilled and are conveyed, in the groups, to the stick insertion station. As previously indicated, the location along the chilling path at which each mix is at the proper point for stick insertion depends upon the nature of the mix itself. In the prior art device, for example, the mechanisms currently in use to insert flat sticks, the entire mechanism must be moved (stick hoppers as well as the insertion mechanism). Thus, it is desirable to be able to longitudinally adjust only the stick insertion mechanism to the position along the path at which this partially solidified state is reached. Thus, the proper point can be chosen such that the stick can be easily inserted but, once inserted will not lose the orientation originally given to it by the insertion mechanism. This longitudinal adjustment is provided by the mounting arrangement for the insertion apparatus housing assembly 30 by longitudinally extending rails 37 and 38 which are mounted in conventional and convenient fashion on the machine frame, not shown, the rails extending over a sufficiently long portion of the mold path to permit adjustment over a number of mold positions. Mounting blocks 39 and 40 can protrude outwardly from the ends of housing 30, the blocks having downwardly opening recesses to receive the rails and tightening screws 41 and 42. This simple arrangement permits the housing 30 to be longitudinally moved along the direction of motion of the mold groups and fixedly located in any desired position so that the sticks can be inserted in the locations which conditions dictate to be most suitable.

As will be recognized, the molds are advanced in stepwise fashion. Thus, a mold group is brought into position under a filling station and the whole set of molds along the entire path is stopped, permitting that mold group to be filled. The entire set of molds is then caused to advance a distance exactly equal to the centerline spacing between mold groups and stopped again, permitting the next group of molds to be filled. This motion is exactly the same adjacent the inserting station, so that it is convenient to calibrate rails 37 and 38 in a manner which permits movement of the insertion station along the rails until a calibration indicative of a stop point for a mold group is reached, whereupon the assembly can be tightened and can remain for the production run of products having a specific mix.

Before turning to a more detailed discussion of the structures involved in the apparatus of FIG. 1, it should be noted that there are definite interrelationships between certain portions of the system which are quite significant. To begin with, mold groups are commonly caused to include various numbers of molds, usually in multiples of six. Thus, the group of molds might include 6, 12, 18 or 24 molds. Thus, it is necessary to cause the stick insertion apparatus to insert the same number of sticks. Depending upon spacing, it may be necessary to substitute a mold block 30 having different centerline spacing or, alternatively, it may only be necessary to not use some of the insertion devices included therein. Depending upon the spacing between mold centerlines, it is possible to use, for example, every third one of the insertion devices shown in the example of FIG. 1, 18 insertion devices having been selected for purposes of illustration.

It will be recognized, in any event, that the center-to-center relationship of the plunger mechanisms and chambers must be directly correlated with that spacing in the mold cavities employed.

The next relationship which is of significance is that the number of tubes 27a-27r which extend between the insertion devices and the feed block must be the same as the number of sticks to be inserted. However, there is no essential correlation between the locations of these two devices. Thus, when adjusting for different mixes, as previously described, the insertion device can be longitudinally adjusted without affecting the location or operation of wheel 13, the manifold and feed block, or the hopper system. This permits a dimension of flexibility, in adjustment of only a small portion of the apparatus, which is not believed to have been heretofore possible.

The other relationship which must be maintained is, of course, the spacing and correlation between the slots 14 in wheel 13 and the holes in the manifold block and feed block. Depending upon the number of sticks to be fed in any set of circumstances, the elements of this system can easily be changed, including the gear ratio between the drive means and axle 14 to properly drive and time the rotation, starting and stopping of wheel 13. This is, of course, simply a matter of calculating the appropriate angles of rotation and correlating that with the speed and sequencing of the drive motors.

The index drive is commercially available from a number of manufacturers. An example of a preferred unit is that offered by the Ferguson Machine Company, a division of UMC Industries, Inc., 11820 Lackland Road, St. Louis, MO, 63141.

The Ferguson equipment offers one feature very important to the successful operation of the apparatus in that it is a precision mechanism utilizing pre-loaded cam roller bearings rotating against the roller gear or cam thus assuring a precise stopping point of the slotted disc at each index with a virtually complete absence of backlash.

Other types of indexing devices such as a ratchet wheel or conjugate cam unit could be employed but with some sacrifice in the precision of the indexing and long, trouble-free operation. Another instance of a commercially available index drive suitable for use herein is that available from Ferguson (supra) marketed under the trademark Para-Dex and described at least in part in U.S. Pat. No. 3,572,173.

FIGS. 2 and 3 show further details of the feeding station mechanism including hopper 10, wheel 13 and the manifold and feed block assemblies. In the example shown, with 18 tubes feeding sticks away from the feed block, wheel 13 is rotated by a suitable stop index drive to bring 18 of notches 14, carrying sticks 15, into alignment with the holes in the manifold and feed blocks, whereupon the rotation of wheel 13 is stopped and valve 20 is opened to cause air under pressure to pass through conduit 18 and drive the sticks through tubes 27a-27r. As shown in FIG. 3, the manifold block includes a back plate 50 into which tube 18 extends. An upper, generally arcuate plate 51 closes the upper portion of the manifold block and a lower plate 52 closes the lower portion thereof with a front plate 53 and end plates completing the manifold chamber. Openings 54 pass through plate 53, as previously described, and are aligned with slots 14 in wheel 13. Arcuate cover plate 26 lies closely adjacent the periphery of wheel 13, in the portion adjacent the blocks, and extends between upper plate 51 and feed block 25 which has openings 55 with enlarged outer portions to receive the ends of the tubes, tube 27j being the one illustrated in FIG. 3.

The tubes themselves are formed using a material suitable for handling articles which are to become part of a food product. The material should also be semi-rigid in the sense that, once formed, it is capable of retaining its shape but still remains sufficiently flexible so that it can be bent when the position of the insertion station is adjusted. In a machine using sticks which are approximately 4 inches long and 11/64 inches diameter, a clear polyvinylchloride tubing having an inner diameter of $\frac{3}{8}$ is suitable. With these dimensional relationships, the tubing can easily be curved, but the minimum curvature radius should not be less than 12 inches to avoid sticking of the sticks within the tubing. This diametrical relationship nevertheless permits sufficient air pressure to be built up within the tubing so that the sticks are rapidly propelled from the feeding to the stick insertion station. It is desirable that the ratio of the tubing inner diameter to the stick diameter should not be less than 2, the foregoing dimensions giving a ratio of 2.18.

A more detailed drawing of the stick insertion apparatus is shown in FIGS. 4-7. A side elevation of the insertion mechanism, with the adjusting rails 37 and 38 removed, is shown in FIG. 4. As seen therein, housing 30 is connected to the tubing which makes, in the embodiment shown, an angle of slightly less than 30° with the central axis of the mold cavities into which sticks are to be inserted. Plunger rods 31 are parallel with the mold axes and are connected to plunger bar 32 which is driven by output shaft 44 of motor 33, as previously indicated. In the condition shown in FIG. 4, a set of sticks has been driven into the molds 36 below the insertion station and the molds are ready to be cycled in the direction of arrow 45 to bring the next set of molds in alignment therewith.

Each chamber within housing 30 is provided with a guide leaf 60 which protrudes out of the rear of the housing and is pivotally connected to a link 61, the other end of link 61 being pivotally connected to a bell crank 62 which is pivotally mounted to pivot about an axis 63, axis 63 being defined by a pin which passes through the bell crank and a fixed plate 64. The other end of crank 62 is connected to a link at the output of a pneumatically actuated piston and cylinder assembly indicated generally at 65, this assembly being of conventional design. As schematically illustrated in FIG. 4, conduits 66 connected to the upper and lower ends of the cylinder portion of assembly 65 are supplied with air under pressure under the control of an air pilot actuated spring return four-way valve 67. Valve 67 receives control signals, along with the remainder of the equipment, from timing and control unit 22.

Figures 6, 7:
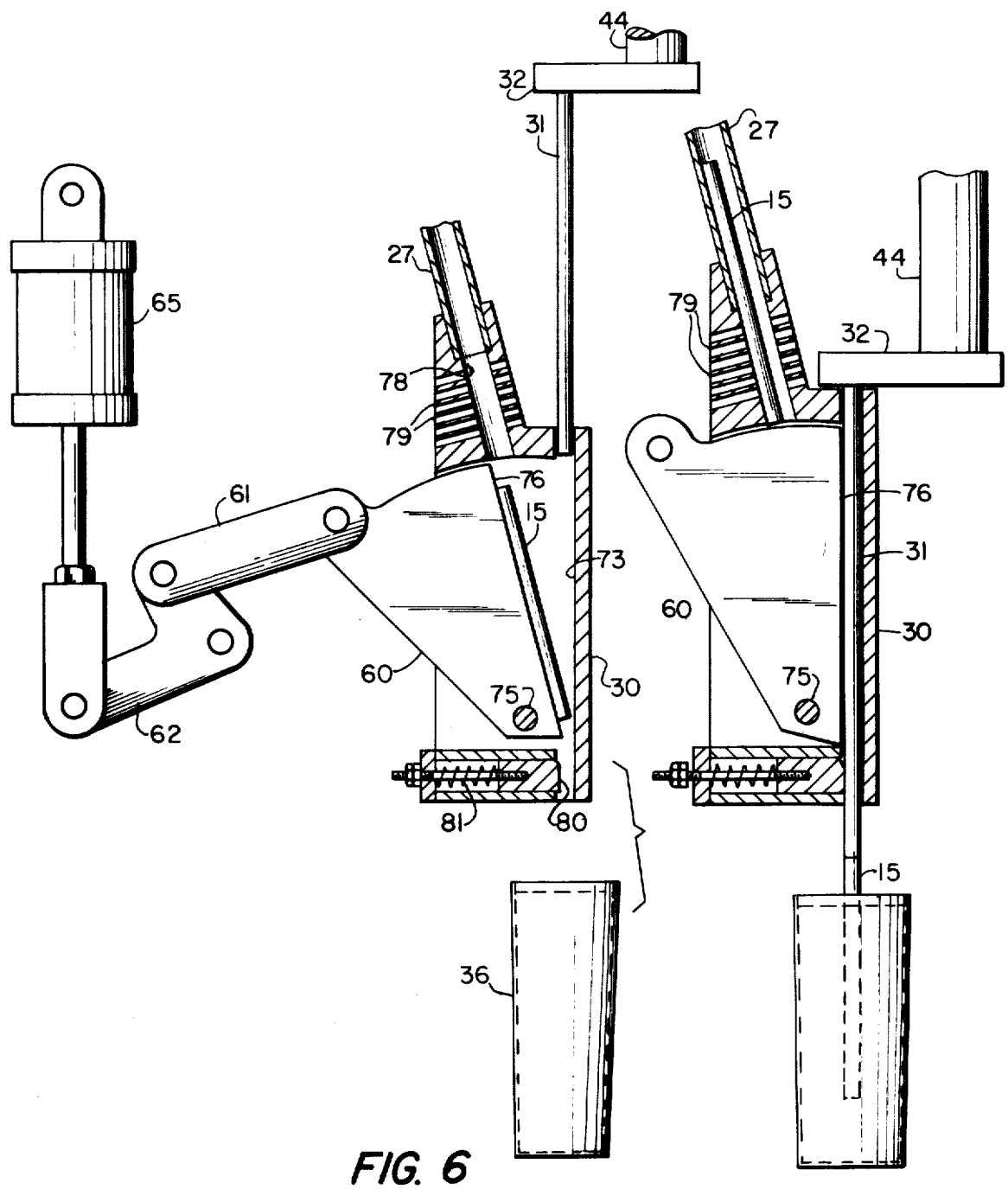
FIG. 6 is a more detailed view of the insertion station apparatus of FIG. 4, showing a movable portion thereof in a stick receiving position.
FIG. 7 is a view of a portion of the apparatus of FIG. 6 in a stick insertion position.

This portion of the apparatus is shown in greater detail in FIGS. 5, 6 and 7 wherein it will be seen that the housing includes a plurality of chambers 70, each having side walls 71 and 72 which are parallel with each other and are spaced apart by a distance slightly greater than the stick diameter. Guide leaf plates 60 in these chambers are generally sector-shaped and are pivotally attached near the lower, smaller end of the plates by pins 75 so that they are rotatable between a first position, shown in FIG. 7, in which the front surface 76 of the plate, along with the side walls 71 and 72 and the inner surface of 73 of the front wall of housing 30 form a chamber which closely fits the stick; and a second position, shown in FIG. 6, in which surface 76 forms an acute angle with the axis of the molds. When motor 65 is operated to the position shown in FIG. 6, the leaf protrudes farthest from housing 30 and surface 76 lies behind the lower end of a tubular passage 78 into which tube 27 extends. Along this passage vent holes 79 permit the escape of excess air. When the mechanism is in the position shown in FIG. 6, a stick 15 delivered through the tube can fall into the chamber so that it lies against surface 76. Operation of motor 65 then causes all of leaves 60 to move to the position shown in FIG. 7 wherein the stick is erected to a position in which its axis is aligned with the axis of the mold cavity. Motor 33 is then operated, causing shaft 44 and bar 32 to drive plunger rods downwardly, driving the sticks into the mold cavities. If another stick 15 is supplied to the insertion station while the leaf is in this position, it rests against the upper arcuate surface of the plate 60 until that plate returns to the position shown in FIG. 6. During this time, vents 79 prevent the build up of excess air pressure within the tubular conduits.

At the lower end of each chamber is a guide plug 80 which is urged perpendicularly toward the opening in the bottom of the chamber by a coil compression spring 81. Thus, a stick which is moved to the erect position cannot simply fall out of the bottom of the insertion mechanism. However, when the plunger mechanism drives rods 31 downwardly, the lower end of the stick cams against the chamfered upper surface of plug 80, causing the plug to move rearwardly against the force of the spring and permitting the stick to emerge from the bottom of the mold insertion chamber.

As seen in FIG. 5, motor 33 can be a pneumatically operated piston and cylinder assembly having conduits extending to the upper and lower portion thereof, the air supply to these conduits being controlled by an air pilot actuated spring return four-way valve indicated generally at 83 which receives its control signals from control unit 22.

While certain advantageous embodiments have been chosen to illustrate the invention, it will be recognized by those skilled in the art that various changes and modifications can be made therein without departing from the scope of the appended claims.

I claim:

1. An apparatus for delivering and inserting handle sticks into a plurality of molds for use in combination with a machine having means for filling said molds and moving groups of the filled molds along a predetermined path, the apparatus comprising:
   an insertion station located along and above said predetermined path;
   a stick feeding station at a location separate and spaced apart from said insertion station;
   means for conveying said sticks from said feeding station to said insertion station; and
   means for mounting said insertion station for longitudinal adjustment relative to said predetermined path independently of said feeding station.

2. A method of forming frozen confection products including inserting handle sticks into the partially solidified products comprising the steps of
   aligning a predetermined number of round sticks in parallel spaced relationship with each other;
   propelling said number of sticks through tubular conduits to an insertion station with fluid under pressure;
   filling a plurality of molds, equal in number to the number of sticks, with a confection composition in flowable form,
   chilling the molds to partially solidify the composition,
   aligning the molds with said insertion station;
   mechanically driving said sticks as a group, into said partially hardened composition; and
   further chilling the molds to complete the solidification of said products.

3. An apparatus for delivering and inserting handle sticks into a plurality of molds for use in combination with a machine having means for filling said molds and moving groups of the filled molds along a predetermined path, the apparatus comprising:
   an insertion station located along and above said predetermined path;
   a stick feeding station at a location separated from said insertion station;
   means at said feeding station for aligning a predetermined number of sticks in substantially parallel spaced relationship;
   means for fluidically conveying said predetermined number of sticks from said feeding station to said insertion station; and
   means at said insertion station for receiving said predetermined number of sticks, for aligning said sticks with the central axes of said molds, and for axially moving said sticks into said molds.

4. An apparatus according to claim 3 wherein said means for fluidically conveying includes
   a source of air;

a plurality of hollow tubes interconnecting said means for aligning and said means for receiving; and means for selectively connecting said source of air to said tubes for propelling said sticks through said tubes.

5. An apparatus according to claim 4 wherein said means for conveying includes
   a feed block at said feeding station having means therein defining a plurality of spaced parallel holes therein,
   the centers of said holes being arranged along an arc of a circle,
   means at each of said holes for connecting said holes to one end of said tubes.

6. An apparatus according to claim 5 wherein said feeding station further comprises
   hopper means for holding a supply of said sticks in substantially parallel relationship,
   and said means for aligning includes a rotatable disc-shaped member having an axial thickness at least as great as the lengths of said sticks,
   said disc-shaped member being mounted with its periphery adjacent said hopper means,
   the periphery of said member having a plurality of axially extending equally spaced recesses for receiving sticks from said hopper means, one stick for each recess,
   said block being mounted adjacent the periphery of said disc angularly separated from said hopper means so that the sticks in said recesses are alignable with the holes in said block.

7. An apparatus according to claim 6 wherein said means for pneumatically conveying further comprises
   a manifold block having means defining a plurality of holes therein equal in number and similar in arrangement to the holes in said feed block;
   a source of air under pressure, and
   conduit and valve means for selectively applying air under pressure to said manifold block and through said recesses in said disc-shaped member and said holes in said feed block to propel the sticks from said recesses through said holes and said tubes to said means for receiving.

8. An apparatus according to claim 7 and further comprising
   a cover member extending between said feed and manifold blocks and covering the periphery of said disc-shaped member adjacent said blocks.

9. An apparatus according to claim 6 wherein said means for receiving and aligning includes a housing having a plurality of chambers therein, each of said chambers having
   one wall movable between a first position in which it is substantially parallel with the axes of said molds and a second position in which said wall forms an acute angle with a mold axis, said chamber being dimensioned to closely retain one of said sticks when said one wall is in said first position;
   first and second openings aligned with said mold axis at the top and bottom, respectively, of said chamber;
   a third opening at the upper end of said chamber and spaced from said first opening, the axis of said third opening being parallel with said wall in said second position;
   means for connecting the other end of one of said tubes to said third opening so that a stick conveyed through said tube can enter said chamber when said one wall is in said second position;
   means for selectively moving said one wall from said second to said first position to align the axis of a stick in said chamber with said first and second openings therein; and
   plunger means insertable through said first opening to drive said stick through said second opening into a mold aligned therewith.

10. An apparatus according to claim 8 wherein each of said chambers further comprises
    a plug extending perpendicularly into one side of said second opening to partially close said opening, and
    spring means for urging said plug toward said second opening, said plug being axially movable against the force of said spring when said plunger means drives said stick downwardly.

11. An apparatus according to claim 9 wherein each of said chambers contains a sector-shaped plate having a thickness substantially equal to the diameter of a stick,
    said plate being pivotally mounted near its smaller end near the bottom of said chamber, one edge of said plate constituting said movable wall;
    and said means for selectively moving said one wall comprises
    a spring-biased solenoid, and
    link means coupled between said solenoid and said plate for moving said plate when said solenoid is engaged and deenergized.

12. An apparatus according to claim 11 wherein the upper surface of said plate is arcuate in shape and extends across said third opening to prevent entry of a stick when said plate is moved to place said one wall in said first position, said upper surface being clear of said third opening to permit entry of a stick when said plate is moved to place said one wall in said second position.

13. An apparatus according to claim 11 wherein said plunger means comprises a rod extendable into and out of said chamber,
    the rods insertable into all of said chambers being connected together for simultaneous movement,
    said plunger means further including a pneumatically operated piston and cylinder assembly to drive said rods.

14. An apparatus according to claim 4 wherein said means for receiving and aligning includes a housing having a plurality of chambers therein, each of said chambers having
    one wall movable between a first position in which it is substantially parallel with the axes of said molds and a second position in which said wall forms an acute angle with a mold axis, said chamber being dimensioned to closely retain one of said sticks when said one wall is in said first position;
    first and second openings aligned with said mold axis at the top and bottom, respectively, of said chamber;
    a third opening at the upper end of said chamber and spaced from said first opening, the axis of said third opening being parallel with said wall in said second position;
    means for connecting the other end of one of said tubes to said third opening so that a stick conveyed through said tube can enter said chamber when said one wall is in said second position;
    means for selectively moving said one wall from said second to said first position to align the axis of a stick in said chamber with said first and second openings therein; and plunger means insertable through said first opening to drive said stick through said second opening into a mold aligned therewith.

15. An apparatus according to claim 14 wherein each of said chambers further comprises a plug extending perpendicularly into one side of said second opening to partially close said opening, and spring means for urging said plug toward said second opening, said plug being axially movable against the force of said spring when said plunger means drives said stick downwardly.

16. An apparatus according to claim 9 wherein each of said chambers contains a sector-shaped plate having a thickness substantially equal to the diameter of a stick, said plate being pivotally mounted near its smaller end near the bottom of said chamber, one edge of said plate constituting said movable wall;

and said means for selectively moving said one wall comprises a spring-biased solenoid, and link means coupled between said solenoid and said plate for moving said plate when said solenoid is engaged and deenergized.

17. An apparatus according to claim 16 wherein the upper surface of said plate is arcuate in shape and extends across said third opening to prevent entry of a stick when said plate is moved to place said one wall in said first position, said upper surface being clear of said third opening to permit entry of a stick when said plate is moved to place said one wall in said second position.

18. An apparatus according to claim 14 wherein said plunger means comprises a rod extendable into and out of said chamber, the rods insertable into all of said chambers being connected together for simultaneous movement, said plunger means further including a pneumatically operated piston and cylinder assembly to drive said rods.

19. An apparatus according to claim 4 wherein each of said hollow tubes comprises an elongated nonlinear section of semi-rigid clear polyvinylchloride tubing having an inner diameter at least twice as great as the diameter of said sticks.

20. An apparatus according to claim 19 wherein the ratio of tube inner diameter to stick diameter is 2.18 and the minimum radius of bends in said tube is about 12 inches.

21. An apparatus in accordance with claim 4 wherein the position of said insertion station is longitudinally adjustable relative to said predetermined path independently of said feeding station.

22. A method according to claim 2 wherein the step of propelling is accomplished using air under pressure.

* * * * *